Oct. 19, 1943.  C. C. THOR  2,332,029
HAY LOADER AND STACKER
Filed Aug. 13, 1942   4 Sheets-Sheet 4

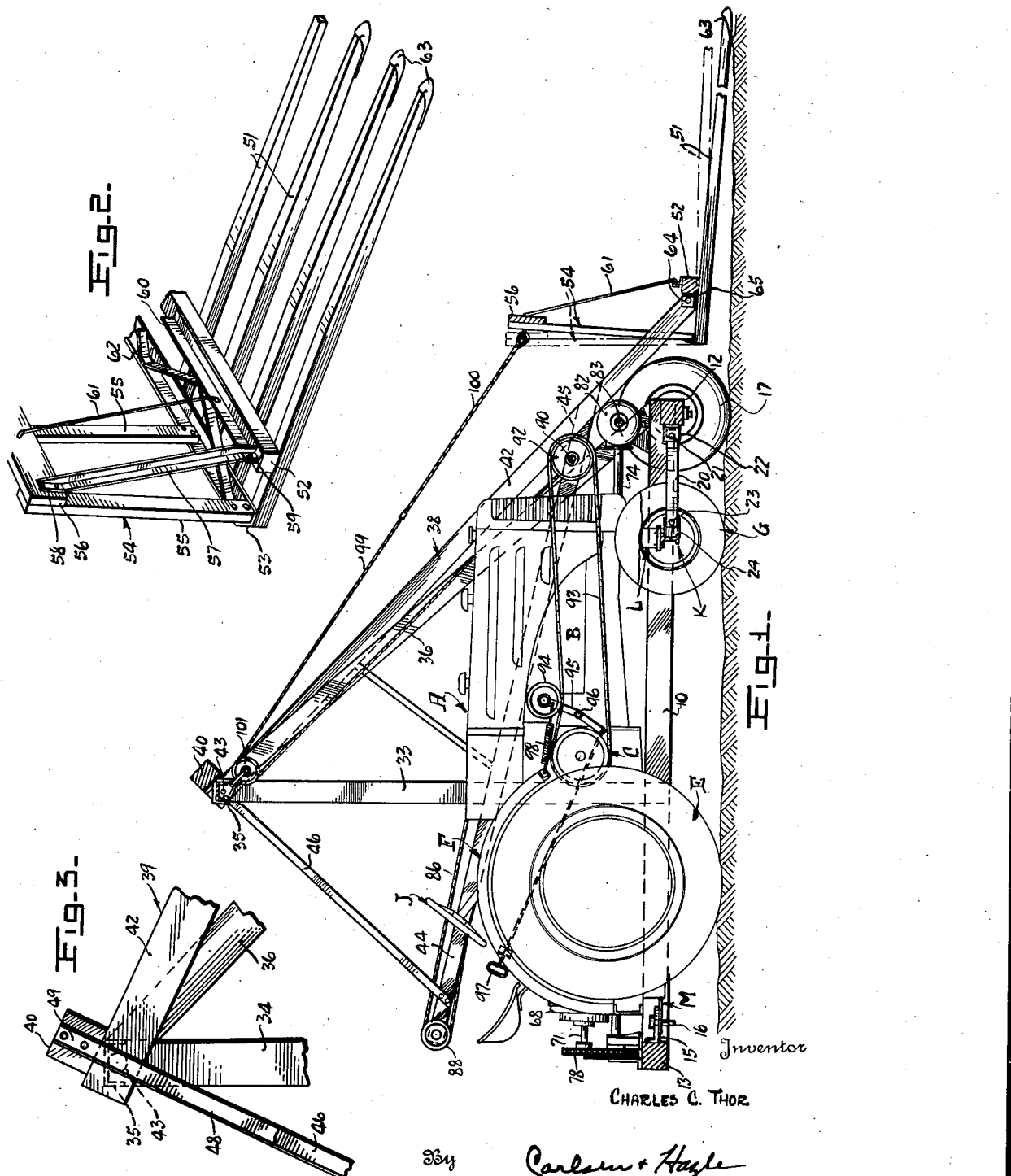

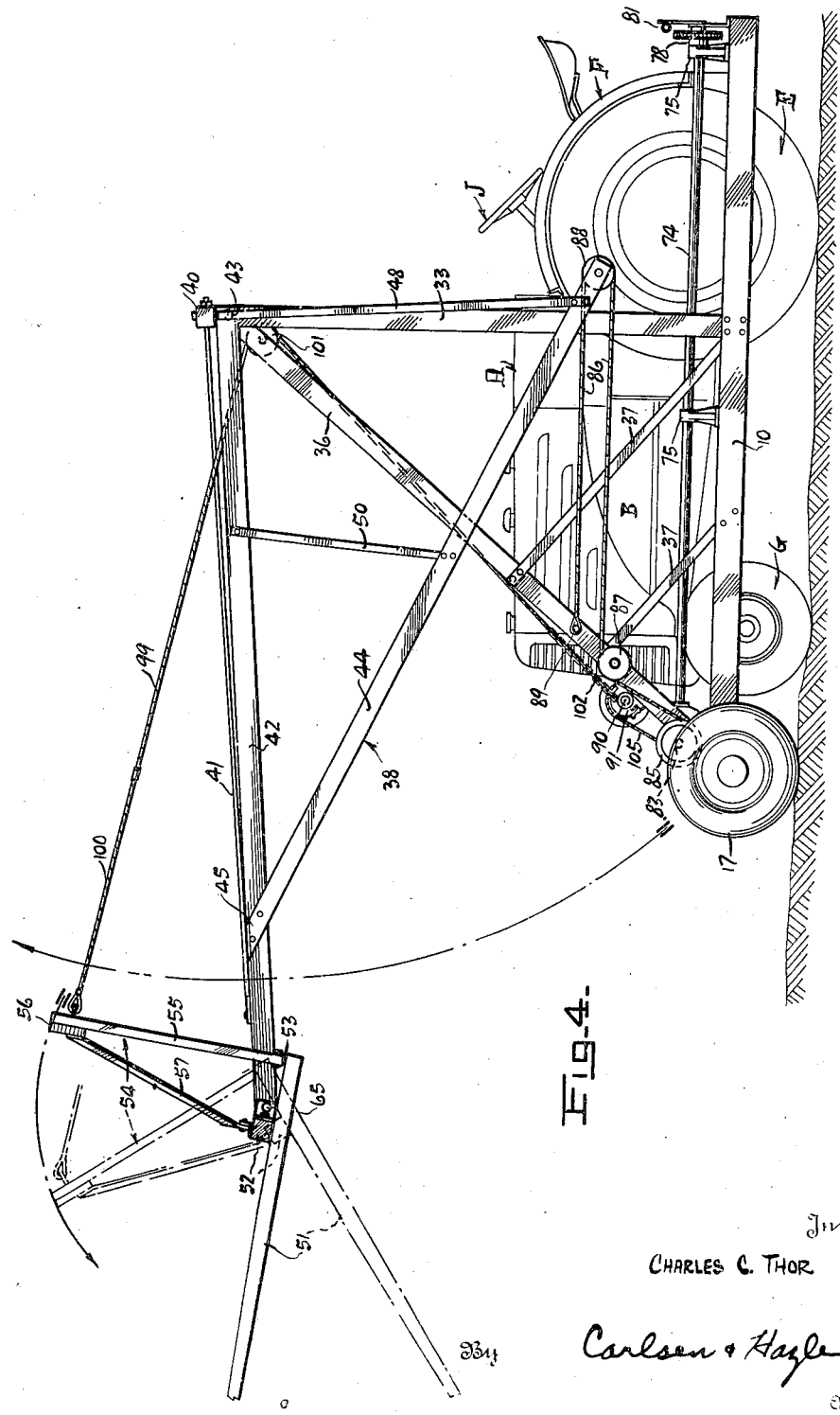

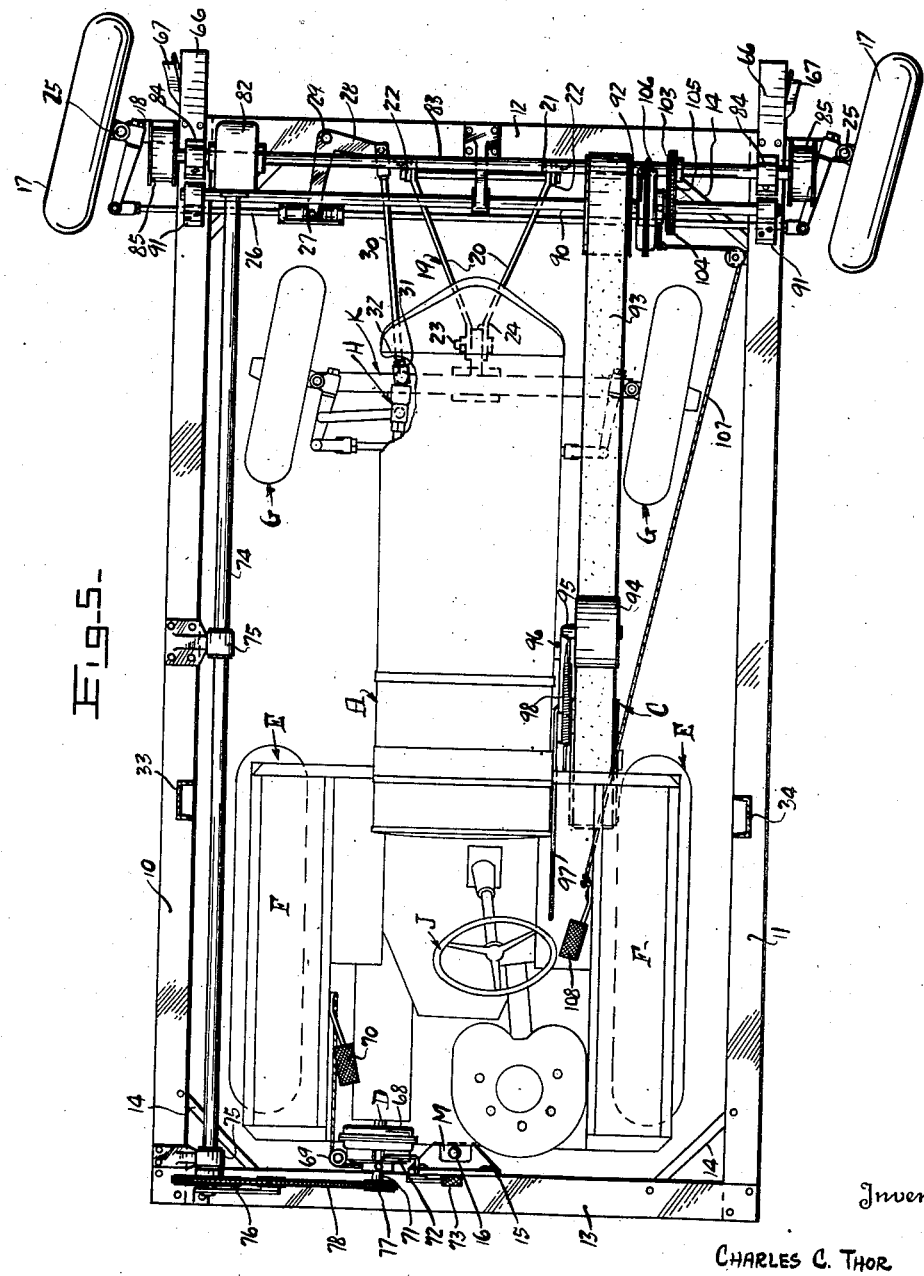

Inventor
CHARLES C. THOR
By Carlsen & Hazle
Attorneys

Patented Oct. 19, 1943

2,332,029

UNITED STATES PATENT OFFICE 2,332,029

HAY LOADER AND STACKER

Charles C. Thor, Stillwater, Minn.

Application August 13, 1942, Serial No. 454,644

3 Claims. (Cl. 214—140)

This invention relates to improvements in implements for handling hay and similar forage crops or combined straw.

The primary object of the invention is to provide an implement of a simple, durable and sturdy form by which the operations of sweep raking, stacking and loading hay, and similar crops, may be readily and rapidly carried out. Another object is to provide a machine or implement of this kind adapted for convenient attachment to, and detachment from, an ordinary farm tractor to utilize the power of the tractor for travel movement and for all manipulations incident to the handling of the crop, but in which the machine is arranged for supporting the greater part of its weight itself, to thereby relieve the tractor of excessive loads. A further object is to provide a machine of this nature which is of compact form and which embodies supporting wheels arranged for manipulation with and by the steering wheels of the tractor so that the machine-tractor combination will handle and steer easily over even the roughest terrain ordinarily encountered in the field. Still a further object of the invention is to provide a machine having the capacity to handle large loads and with novel and effective control and power actuating means for controlling and carrying out all of the required operations.

These and other more detailed and specific objects will be disclosed in the course of the following specification, reference being had to the accompanying drawings, in which—

Fig. 1 is a longitudinal vertical sectional view through my implement, showing the same as mounted on a tractor and with the hay fork and rake device in its lowered position.

Fig. 2 is a fragmentary perspective view of the fork or rake alone.

Fig. 3 is an enlarged fragmentary detail view in side elevation of the supporting pivot means for the fork carrier.

Fig. 4 is a side elevation of the implement-tractor combination, viewing the same from the side opposite to that shown in Fig. 1, and showing the fork in raised and dumping positions.

Fig. 5 is an enlarged plan view of the main frame construction of the implement and the tractor.

Figure 6:
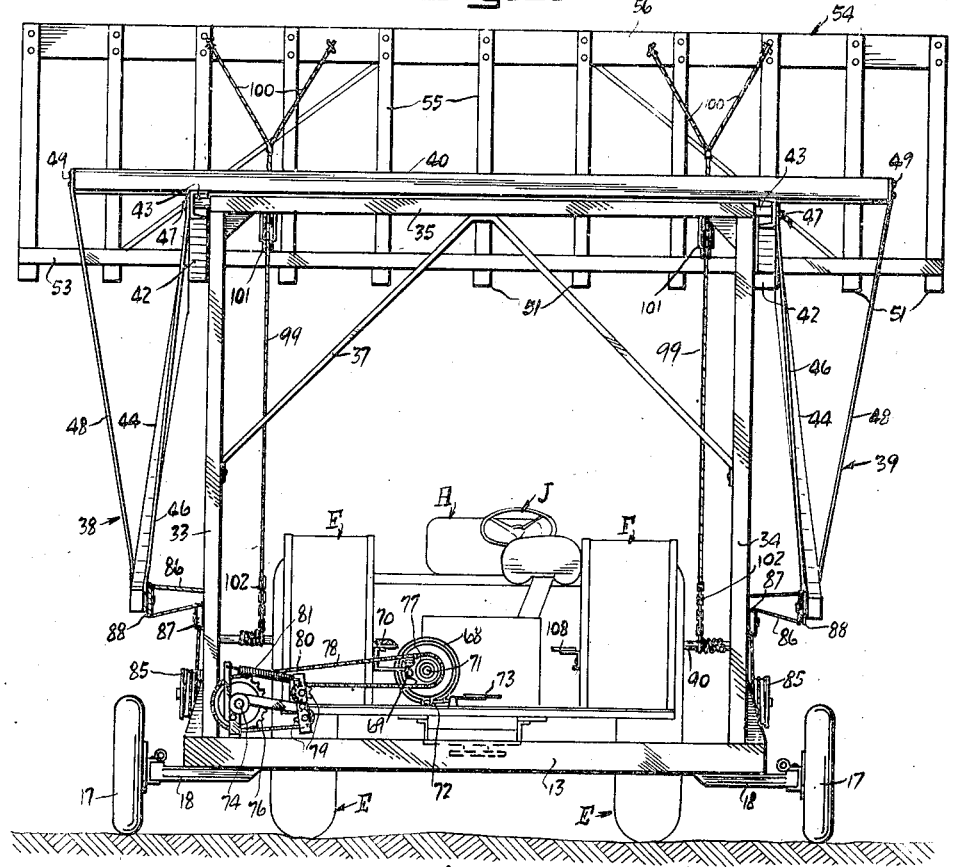
Fig. 6 is a rear elevation of the invention as shown in Fig. 4.
Figure 7:
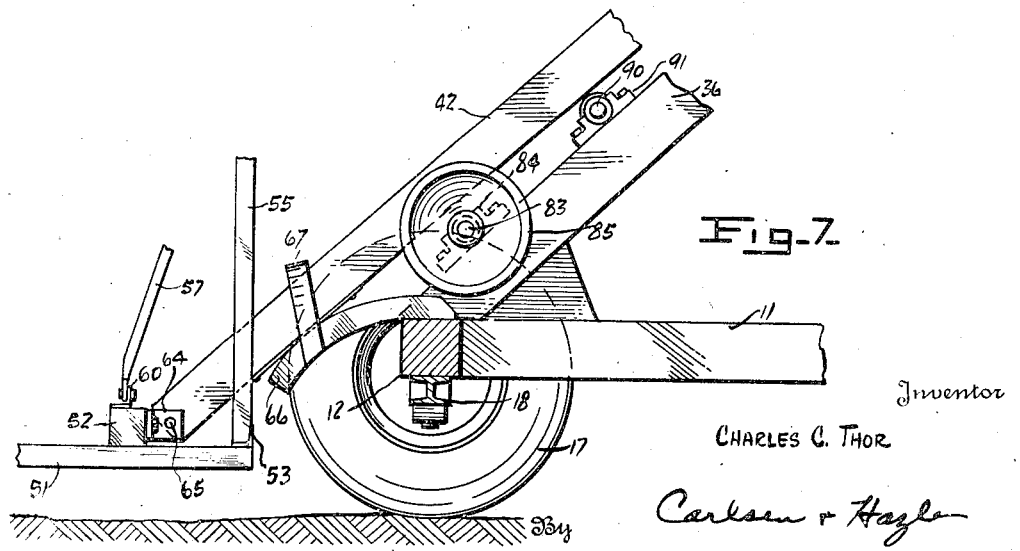
Fig. 7 is an enlarged fragmentary view of a forward end of the implement showing details of the fork supporting means.

Referring now with more particularity to the drawings, I have shown my invention as attached to and used in combination with a conventional form of tractor, designated generally at A, having an engine B driving a belt pulley C on one side and a rearwardly extending power take-off shaft D (Fig. 5) at the back. The engine also of course drives the rear traction wheels E which are partially covered by fenders F and the forward end of the tractor is supported by front wheels G which may be steered by a steering member H (Fig. 5) operated by the steering wheel J. The wheels G are connected by an oscillating front axle K on the steering post L, and the tractor also includes the rearwardly extending draw bar M. The shaft D and pulley C constitute two separate power take-off connections to which connection may be made for power operation of stacker parts as will be evident.

The implement of my invention comprises a main or transport frame which is of rectangular shape made up of sides or side members 10 and 11 and transverse front and rear members or cross pieces 12 and 13, the assembled frame being of such size as to surround the tractor A as best seen in Fig. 5. Suitable bracing 14 is provided at the corners of the frame to make the same rigid. The frame is of course wider than the tractor and considerably longer to permit room for steering operations of the tractor and the mounting of various parts of the implement as will be described.

This frame is adapted to be transported by the tractor and for this purpose I provide on the rear cross member 13 a bracket 15 having an opening to pass a pin 16 which fits the draw bar M of the tractor. In this manner the rear end of the frame is supported above the ground. At the forward end the frame is provided with its own wheels 17 which are mounted on axles 18 fitted on the forward cross member 12 and which support the frame and level it both front to back and crosswise. To prevent lateral movements of the front end of the frame relative to the tractor a connecting device 19 is provided comprising forwardly diverging links 20 which are pivoted at their widespread forward ends to a pin 21 carried in brackets 22 secured to forward cross member 12, and at their rear ends these links carry a pin 23 mounted through a bracket 24 welded, or otherwise secured, to the front axle K of the tractor at its center. The opening in this bracket 24 for the pin 23 is elongated to provide sufficient play and permit relative up and down movements of the front end of the frame and tractor as will occur in travel over rough ground. Attention is, however, directed to the fact that the links 20 do not serve as drag links, but only as lateral stays, the frame being carried forward or rearward by the tractor through the connection to the draw bar M thereof.

The front wheels 17 for the frame are conventionally arranged for steering, having knuckles 25 and a radius rod 26, which rod intermediate its ends carries a bracket 27 to which is pivoted one end of a bell-crank lever 28. This lever is fulcrumed at 29 on the front cross member 12 (Fig. 5) and at its other end is pivotally connected to a steering rod 30 extending rearwardly and having a detachable socket connection 31 to a ball 32 welded on the steering member H of the tractor. Then connections are so made that the wheels 17 will be steered in accordance with steering movements of the tractor wheels G to thus cause the frame, and all parts supported thereon, to handle and steer as a unit with the tractor.

The main frame is completed by upright supporting parts or members 33 and 34 erected on each side member 10 and 11 of the base frame and which at points slightly to the rear of center and which parts are rigidly connected at upper ends by a cross beam or header 35. The posts further are rigidly secured by forwardly and downwardly angled brace bars or members 36, secured to upper ends of the posts and to forward corners of the base frame, and by auxiliary stay bars 37 arranged as shown.

The main frame thus constructed supports a swinging carrier frame made up of two similar, triangular side cradles or rocker frames, designated generally at 38 and 39, connected by a cross beam 40 and suitable bracing 41. The cradles or rocker frames 38 and 39 comprise main members or booms 42 which at their rear or upper ends are pivotally mounted upon transversely and horizontally axised and laterally extending pins 43 secured to upper ends of the posts 33 and 34, or to the cross member 35. Thrust bars 44 are secured at one end at 45 to the booms 42, near their forward ends, and extend angularly rearward and downward therefrom; and between the rear and widespread ends of the booms and thrust bars spaced tie bars are secured to the parts to complete the triangular configuration of the cradles or rocker frames. These tie bars are in pairs with the innermost ones 46 secured as at 47 to the pivoted ends of the booms 42, while the outermost bars 48 are secured, as at 49, to the ends of the cross beam 40 which ends are laterally extended beyond the points at which they are fastened to the booms. As a result the tie bars of each pair, or at each side of the machine, are spread apart laterally at upper ends (Fig. 6) providing lateral stiffening for each triangular frame and particularly preventing rear ends of the thrust bars 44 from swaying from side to side. Additional bracing is provided by brace bars 50 between booms and thrust bars, and by the bracing 41 which is secured between the booms and the cross beam 40.

It will be apparent from the foregoing that the two triangular cradles thus formed may swing up and down in upright longitudinal planes at the side of the main frame and that the forward ends of the booms 42 may be raised and lowered forwardly of the tractor and implement.

The work holding device is hereinafter referred to as the fork, although it is used also as a sweep or rake, and it comprises a series of parallel teeth or fingers 51 of elongated form secured near rear ends below a cross bar or beam 52. To the rear ends of the teeth a back bar 53 is secured and runs parallel with and to the rear of the cross bar 52. A rake back or back board 54 is erected upon the back bar 53 and comprises spaced uprights 55 joined at upper ends by a cross board 56 and braced in position by downwardly and forwardly angled braces 57 at each side. These side braces 57 are secured at upper ends at 58 to the cross board and at lower ends at 59 to an angle 60 secured on the cross bar 52. Between the sides the bracing is supplemented by brace rods 61, as clearly shown, and other bracing is provided by bridging 62 between the bars 52 and 53. The teeth or fingers extend some distance forwardly of the back board and at their forward ends are provided with pointed, runner-like shoes 63.

The forward ends of the booms 42 pass forwardly between certain of the uprights 55 and are received between spaced pairs of brackets 64 secured to rear sides of the cross bar 52. Transversely and horizontally axised pins 65 are pivoted through the brackets 64 and the boom ends to pivotally support the fork from the booms but permit relative pivoting movements therebetween. The booms 42 are, of course, of such length that, when they are lowered, the fork may rest with its rear edge near the ground forward of the main frame of the implement and with the fingers 52 extended forwardly and downwardly to ride at forward ends on the ground as best seen in Fig. 1. In this position the booms rest upon stops 66 secured to the corners of the main frame and fall between outwardly curved guides 67 which prevent lateral displacement, the stops also relieving operating parts of strain when the fork is lowered.

For raising and lowering the booms and fork I provide connections to the power take-off shaft M of the tractor which will now be described. A conventional form of clutch 68 is mounted upon the shaft M with its control mechanism 69 arranged to be actuated by a foot pedal 70 mounted on one fender F. By operating this pedal the shaft M may be connected to, or disconnected from, a stub shaft 71 forming a part of the clutch as will be apparent. A brake mechanism 72 is also arranged in connection with the clutch to permit braking forces to be applied to and removed from this shaft 71 and this mechanism is controlled by such means as a foot pedal 73, or if more convenient by a hand lever (not shown). A drive shaft 74 is journaled in bearings 75 along one side of the base frame and at its rear end carries a sprocket 76 in line with a drive sprocket 77 secured to the stub shaft 71 so that a sprocket chain 78 may be arranged to transmit the drive. The chain 78 passes also around idler sprockets 79 arranged in a swinging frame 80 and normally adjusted by a spring 81 (Fig. 6) to hold the chain taut even when the implement moves relative to the tractor as it does in travel over rough ground.

At its forward end the drive shaft 74 is connected through a gear box 82 to a transverse spool or drum shaft 83 which is journaled at its ends through bearings 84 secured to the braces 36 near the forward corners of the main frame. Spools or cable drums 85 are secured to the ends of the shaft 83 outwardly of said braces and cables 86 (one at each side) are wound at their respective ends upon the drums, trained upwardly and rearwardly over pulleys 87 mounted on the braces, upwardly and then back forwardly over pulleys 88 on rear ends of the thrust bars 44, and finally secured at their other ends at 89 to the braces above the pulleys 87. Obviously the rotation of the spools or drums 85, in the proper direction to wind the cables 86 thereon, will result in shortening the cables and pulling forward on the ends of the thrust bars 44 to exert upward and forward lifting forces upon the booms 42, while unwinding the cables will lower the booms. It is understood of course that the weight on the booms is so distributed that they will descend of their own weight as the cables pay out from the drums.

A countershaft or fork control shaft 90 is arranged parallel with and above the shaft 83, being journalled at its ends in bearings 91 secured to the braces 36, and this shaft carries a belt pulley 92 over which, and over the pulley C of the tractor, is trained a belt 93. A tightener pulley 94 is journaled on an arm 95 pivoted at 96 on the side of the tractor and the arm may be oscillated by a control member or rod 97 to cause the pulley to tighten the belt and establish driving connection to the shaft 90 as will be apparent. Normally the pulley 94 is held out of contact with the belt to hang slack so that no drive is transmitted to the shaft.

Cables 99 are connected at their forward bridle ends 100 to the back board 54 of the fork, near each side thereof, and these cables run rearwardly over pulleys 101 carried by the cross member 35 and then downwardly toward the shaft 90, the other ends of the cables being connected to short lengths of chain 102 which are secured to and wound about the shaft near its ends. When the shaft is rotated to wind up the chain a pull will be exerted on the cables tilting the fork about the axes of the pins 65 and raising the forward ends of the rake fingers 51. When the chain is unwound the cables will be slacked off to reverse this movement, it being understood that the fork is so balanced by its construction that it will normally of its own weight tend to tilt downwardly at its forward end.

The fork control shaft 90 is also connected to the shaft 83, each shaft carrying a sprocket, designated respectively at 103 and 104, over which runs a sprocket chain 105. The sprocket 104 is connected through a conventional form of clutch 106 to the shaft 90 and the control mechanism of this clutch is actuated by a cable 107 connected to a foot pedal 108 on the tractor fender F. The clutch normally connects the shaft 90 to shaft 83 so that both rotate at the same time and so that the shaft 90 will be locked when the shaft 83 is not turning, to thus hold the fork at any adjusted, tilted position. When the clutch is released the shaft 90 may turn free, or may be rotated independently by the belt 93. The ratio of the sprockets 103 and 104 is important as will presently appear.

In operation, the machine is moved by the tractor over the field with the fork lowered so that the fingers 51 sweep and rake up the hay or crop until the fork is full. For stacking or loading, the fork when thus loaded is first tilted back slightly to level it as seen in broken lines in Fig. 1, to prevent dislodgement of the load, by engaging the belt drive momentarily. The fork is then carried to the stack or other destination while it rests upon the stops 66, the clearance being sufficient for travel over the field. The loaded fork may be raised to any desired height by manipulating the pedal 70 when the stack is reached, by engaging the clutch 68 and driving shafts 74 and 83 to rotate the drums 85 and wind up the cables 86. When the clutch is disengaged the brake 72 will hold the fork at the adjusted level and the machine may be run to the stack or wagon without interference from the fork. To deposit the load the fork is then tilted downwardly as seen in broken lines in Fig. 4, this being accomplished by momentarily releasing the clutch 106 allowing the shaft 90 to turn free and slacking off the cables 99. The machine may then be backed away and the fork leveled again by manipulating the control member 97 to engage the idler pulley 94 and tighten the belt 93 whereupon the cables 99 will be tightened and the fork pulled up to the desired position. The fork may be lowered to the ground ready for the next operation by releasing the brake 72 through manipulation of the pedal or lever 73, this operation permitting the shafts 74 and 83 to turn free of the connection to the power take-off and the fork and carrier frames 38 and 39 descending of their own weight. All operations are seen to be readily carried out by straight forward and simple manipulation of the controls and with nicety of control over all movements, making it easy after but little practice to rapidly carry out all of the heretofore laborious work of handling crops of this nature.

It will be evident that as the fork is raised from loading to dumping positions (Fig. 1 to Fig. 4) the distance between the points of attachment of the cables 99 to the fork and the pivot axis of the pins 43 will gradually increase due to the comparative leverages involved and the normal effect of this function would be to gradually tilt the fork rearwardly, or upwardly at its forward edge. This action would increase the higher the fork was raised and unless counteracted would possibly cause the load to fall back upon the tractor or would so disturb it that parts at least would fall clear.

It is to correct this that I have provided the sprocket chain connection between the shafts 83 and 90. As the fork is raised the shaft 83 is of course rotated and the sprocket chain 105 causes a corresponding rotation of the shaft 90, through the normally engaged clutch 106, so that the chains 102 are gradually unwound and the cables 99 lengthened to preserve the level of the fork. By properly proportioning the ratio between the sprockets 103 and 104 this rotation of the shaft 90 may obviously be caused to exactly compensate for the increase in effective distance between the fork connections (of the cables) and the pivot center as described above. When the fork is lowered the action is reversed to retain the fork level in this operation also. During such times as the belt drive to the shaft 90 is engaged to tilt the fork upwardly at its forward end the clutch 106 is of course released so that no interference is encountered from the sprocket chain connection to the shaft 83, and conversely it will be evident that when the clutch is reengaged the normally locked condition of the shaft 83 will lock the shaft 90 and thereby retain the fork adjustment.

The lifting operation may be carried out far beyond the level seen in Fig. 4 and is only limited by the amount to which the cables 86 may be shortened around the pulleys 87 and 88.

In connecting the machine to the tractor, the tractor is simply driven into the base frame over the rear end member 13 and this end is then lifted and connected to the draw bar. Front end and steering connections are then made as previously described, and the various power and operating parts connected. These operations, and those incident to the disconnection of the implement, may be carried out quickly as will be evident.

The front wheel support of the implement upon its own wheels 17 is important inasmuch as it relieves the tractor of excessive weights and strains, permits the building of the implement in heavy and durable form and the handling of heavy pay loads. At the same time the steering of the wheels 17 and the flexibility for relative floating movements between implement and tractor at the forward end causes the combination to handle easily over all fields.

The positions and construction of all controls and driving connections to the tractor are of course subject to variations according to the type of tractor to which the machine is to be attached.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A tractor mounted hay loader and stacker comprising a swinging frame and tractor operated mechanism for raising and lowering the frame with respect to the ground, a fork on the frame adapted in the lowered position thereof to rake up the crop and in the raised position to deposit the crop upon a stack, the said fork being tiltably supported upon the frame for adjusting the inclination of the fork relative to the ground and for dumping the crop, a shaft and releasable means for operating the same by tractor power, cables connected at one end to the fork and at their other ends adapted to be wound upon or unwound from the shaft to thereby tilt the fork, the said frame raising and lowering mechanism also including a shaft operated by the tractor, and means connecting the shafts whereby the cable adjusting shaft may be operated by the shaft of said raising and lowering mechanism to progressively adjust the cables as the fork is raised and lowered.

2. A tractor mounted hay loader and stacker comprising a swinging frame and tractor operated mechanism for raising and lowering the frame with respect to the ground, a fork on the frame adapted in the lowered position thereof to rake up the crop and in the raised position to deposit the crop upon a stack, the said fork being tiltably supported upon the frame for adjusting the inclination of the fork relative to the ground and for dumping the crop, a shaft and releasable means for operating the same by tractor power, cables connected at one end to the fork and at their other ends adapted to be wound upon or unwound from the shaft to thereby tilt the fork, the said frame raising and lowering mechanism also including a shaft operated by the tractor, means connecting the shafts whereby the cable adjusting shaft may be operated by the shaft of said raising and lowering mechanism to progressively adjust the cables as the fork is raised and lowered, and said shaft connecting means including a clutch for disabling the said connection when the cable adjusting shaft is power actuated.

3. In a tractor mounted hay loader and stacker of the character described, a main frame supported upon the tractor, substantially triangular cradle frames arranged one at each side of the main frame and each comprising a boom pivoted at one end to an upper part of the main frame for up and down movements at forward ends ahead of the tractor, thrust bars connected to forward ends of the booms and extending back therebeneath in diverging relation thereto, a cross beam connecting the pivoting ends of the booms and extending laterally therebeyond, stay bars connected at lower ends to the thrust bars and diverging upwardly to points of connection with said cross beam to laterally stiffen the cradle frames, and a fork connected to forward ends of the booms.

CHARLES C. THOR.